UNITED STATES PATENT OFFICE.

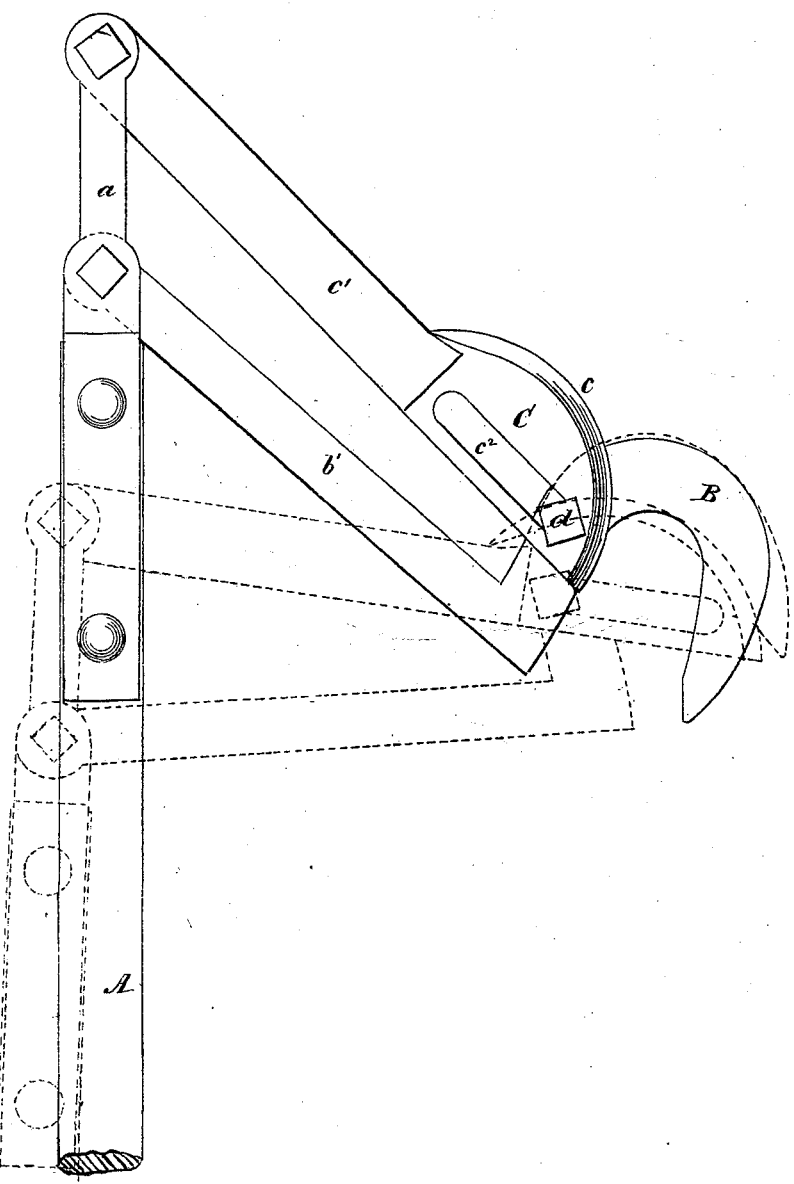

JOSEPH S. CRUM, OF PALMYRA, ILLINOIS.

IMPROVEMENT IN PRUNING-KNIVES.

Specification forming part of Letters Patent No. 139,119, dated May 20, 1873; application filed April 28, 1873.

*To all whom it may concern:*

Be it known that I, JOSEPH S. CRUM, of Palmyra, in the county of Macoupin and State of Illinois, have invented a new and useful Improvement in Pruning-Knives, and I do hereby declare the following to be a full, clear, and exact description of the same, reference being had to the accompanying drawing forming part of this specification in which the figure represents a side elevation:

The invention consists in the improvement of pruning-knives, as hereinafter fully described and subsequently pointed out in the claim.

In the drawing, A represents the handle, which may be of the usual or any preferred length, or made so as to be adjustable in length. B is the hook which is used to catch over the branch that is to be lopped off, and C is the cutter-blade, having a convex edge, $c$, and a shank, $c'$. The shanks $b'$ of hook and $c'$ of blade are each pivoted at the end between the two straps $a$ $a$ attached to handle. The blade C has also a slot, $c^2$, in which slides a bolt, D, which is provided with a head, $d$, on one end and a nut that works on the other threaded end.

The operation is as follows: The hook B being made to catch over a branch, the operator pulls upon the handle A. This causes both the hook and blade to turn on their pivots and in an upward direction, but as they vibrate upon different centers of motion, while the blade is confined and guided in its movements by the slot and pin, the said blade passes across the cavity of hook with its edge bearing close to one side thereof. This has the effect of cutting off the branch neatly, effectually, and with comparatively little trouble to the operator.

Having thus described my invention, what I claim as new, and wish to secure by Letters Patent, is—

The hook B and slotted convex-edged blade C connected by sliding bolt, and having their respective shanks pivoted between the straps of handle, as and for the purpose described.

JOSEPH S. CRUM.

Witnesses:
JOHN H. CALLAHAN,
LEWIS R. HOLLY.